United States Patent [19]

Williams et al.

[11] Patent Number: 4,969,058
[45] Date of Patent: Nov. 6, 1990

[54] CARRIAGE ASSEMBLY FOR HIGH TRACK DENSITY FLEXIBLE MAGNETIC DISK DRIVE

[75] Inventors: Stephen P. Williams, San Jose; Roger O. Williams, Fremont, both of Calif.

[73] Assignee: Insite Peripherals, San Jose, Calif.

[21] Appl. No.: 269,778

[22] Filed: Nov. 10, 1988

[51] Int. Cl.$^5$ .................. G11B 5/596; G11B 5/48
[52] U.S. Cl. .................. 360/77.03; 360/78.05; 360/78.12; 360/104
[58] Field of Search .............. 360/77.03, 78.05, 78.12, 360/78.13, 104, 105, 106, 107

[56] References Cited

U.S. PATENT DOCUMENTS

| | | | |
|---|---|---|---|
| 3,924,268 | 12/1975 | McIntosh et al. | 360/97.01 |
| 4,630,145 | 12/1986 | Thompson et al. | 360/77.08 |
| 4,811,140 | 3/1989 | Enami et al. | 360/104 |
| 4,811,143 | 3/1989 | Ohashi et al. | 360/104 |
| 4,814,916 | 3/1989 | Nishida et al. | 360/106 |
| 4,816,939 | 3/1989 | Ford et al. | 360/77.03 |
| 4,841,396 | 6/1989 | Kawasaki | 360/104 |
| 4,849,840 | 7/1989 | Fujioka | 360/104 |
| 4,858,040 | 8/1989 | Hazebrouck | 360/78.12 |

OTHER PUBLICATIONS

N. Koshino and S. Ogawa, Optical Method of the Head Positioning in Magnetic Disk Systems, reprint from IEEE Transactions on Magnetics (1980).

*Primary Examiner*—Vincent P. Canney
*Assistant Examiner*—David L. Robertson
*Attorney, Agent, or Firm*—Thomas E. Schatzel

[57] ABSTRACT

A carriage assembly for use with high track density flexible magnetic disk drive systems that comprises a base carriage, which supports a permanent magnet, driven by a stepper motor used to achieve course positioning of the carriage assembly. A fine position acutator is attached to the base carriage by a pair of flexible metal strips that permit movement of the actuator relative to the base carriage for fine positioning of a pair of magnetic heads. The fine position actuator comprises a voice coil bobbin, an upper arm which supports an upper magnetic read/write head, a lower arm which supports a lower magnetic read/write head and a hinge which connects the upper and lower arms. An optical servo tracking assembly mounted on the actuator senses optical servo tracking information on a surface of a magnetic disk and generates a signal which activates the voice coil bobbin causing movement of the actuator relative to the base carriage. The materials used in the upper and lower arms and in the hinge are chosen so as to nullify the effects of thermal and hygroscopic expansion.

31 Claims, 2 Drawing Sheets

U.S. Patent  Nov. 6, 1990  Sheet 1 of 2  4,969,058
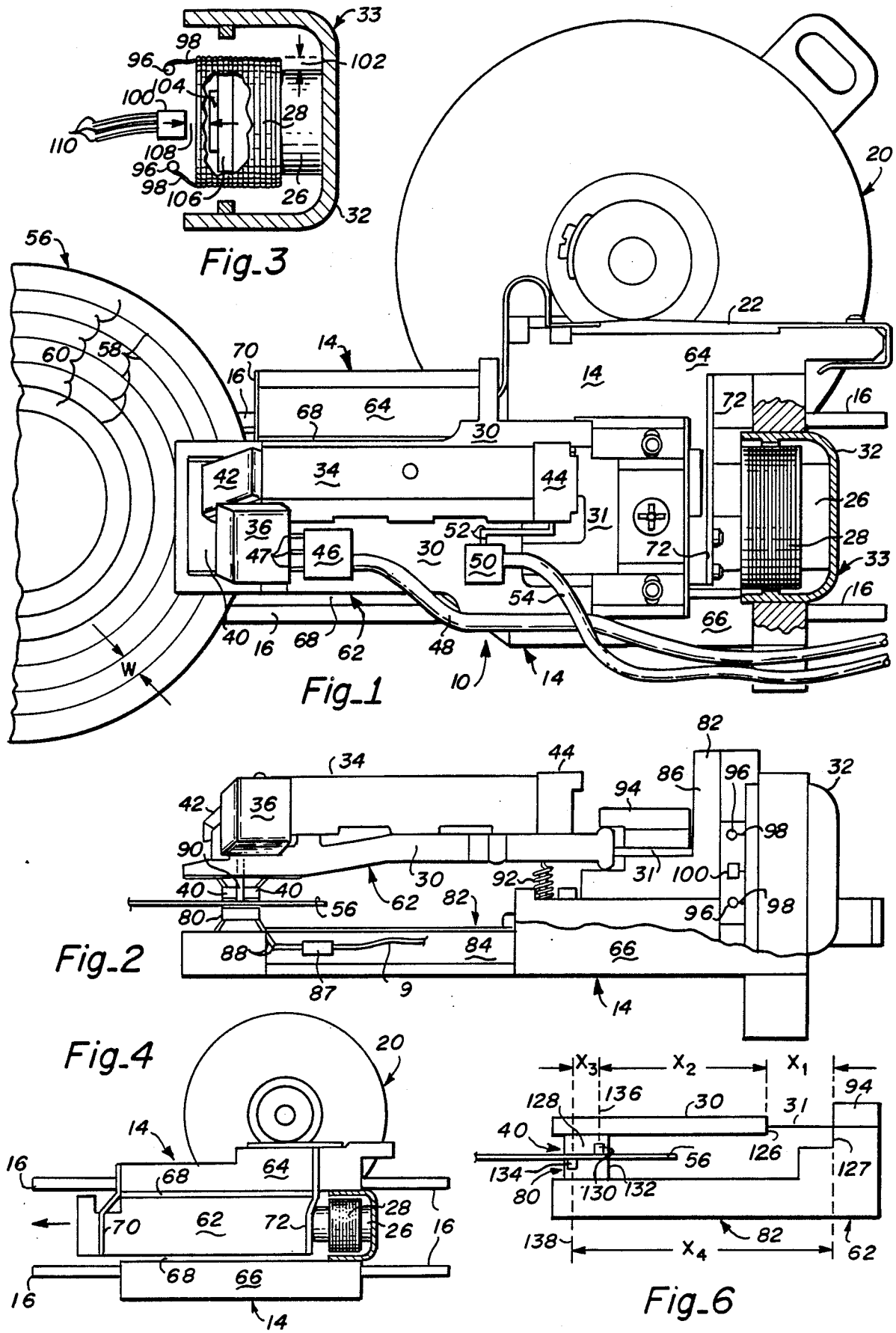

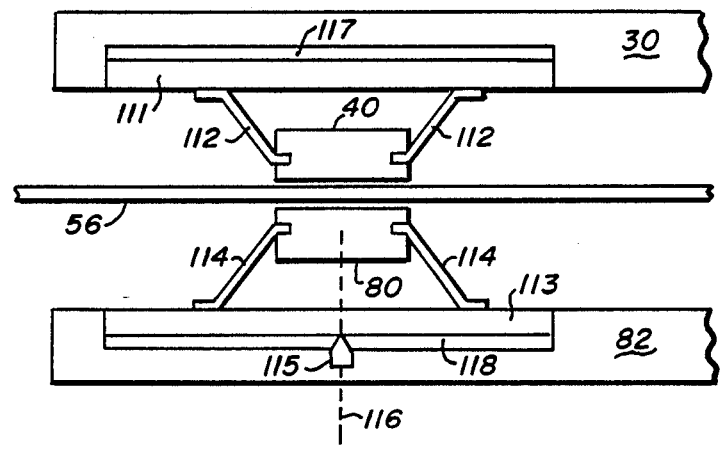
Fig_5

CARRIAGE ASSEMBLY FOR HIGH TRACK DENSITY FLEXIBLE MAGNETIC DISK DRIVE

BACKGROUND OF THE INVENTION

1. Field of the Invention

The present invention relates generally to a carriage assembly for use with flexible magnetic disk drive systems and more particularly to a carriage assembly that utilizes a stepper motor and a voice coil motor to permit optical servo tracking in a high track density flexible magnetic disk drive system.

2. Description of the Prior Art

The track density of magnetic storage disks for conventional floppy disk drives is approximately forty-eight to one hundred thirty-five tracks per inch (TPI). In contrast, optical disk drives are capable of achieving track densities in excess of 15,000 TPI. These higher track densities are achieved through the use of closed loop optical servos that allow an optical read/write head to follow data track eccentricities caused by defects in the medium and by disturbances from outside forces. In rigid type magnetic disk drives, track densities of up to 1500 TPI are presently used. These drives commonly have multiple disks in which both sides are used for data. To achieve the high track density a dedicated surface of one of the disks is used for magnetic track servo information.

Various techniques have been reported for using optical means for acquiring track following servo information contained on a magnetic recording medium. For example, Ahn, et al., in U.S. Pat. No. 4,633,451, issued on Dec. 30, 1986, for "Optical Servo For Magnetic Disks", discloses the use of a laser diode to read track following servo information in the form of a plurality of spots contained in an optical layer positioned above a magnetic recording layer.

M. Johnson, in U.S. Pat. No. 4,558,383, issued on Dec. 10, 1985, for "Information Storage Disk Transducer Position Control System Using a Prerecorded Servo Pattern Requiring No Alignment With The Storage Disk", discloses a servo apparatus having a sensor for detecting a pattern of spots on a surface of an information storage medium. The spots comprise a dense array of substantially translation invariant marks and separate information recording tracks are detected by measuring the rate at which the spots are detected.

J. Cocke, et al., in U.S. Pat. No. 4,587,579, issued on May 6, 1986, for "System for Position Detection On A Rotating Disk", disclose a servo control system comprising a detector for reading a plurality of spiral radial-position-encoding patterns on a medium.

N. Koshino and S. Ogawa, in "Optical Method Of The Head Positioning In Magnetic Disk Systems", preprint from *IEEE Transactions on Magnetics* (1980), discloses an optical head for achieving track following servo control which is mounted on the head arm and which includes an LED light source and three optical fibers for delivering light to a medium. The medium comprises a plurality of circular optical tracks, dyed black, and located underneath a magnetic film.

In U.S. patent application Ser. No. 07/178,542, filed Apr. 7, 1988, an optical servo tracking head is disclosed for reading optical servo tracking information contained on magnetic media comprising nonreflecting servo areas situated around reflective land areas.

Related work has occurred in the laser video disk area, from which optical disks for digital data storage and the audio laser disk (CD) have evolved. Fundamentally, the optical servo information is inscribed and used in the same way for all these disks. A laser and associated optics positioned on a carriage assembly are used to acquire the optical servo information as well as to read data from the disk. Typically, CD disk drive systems utilize a flexure/voice coil design in the optical focus assembly.

T. Aihara, et al, in U.S. Pat. No. 4,092,529, issued May 30, 1978, disclose an optical detecting head suspended by resilient leaf springs or wires and driven by a magnet and coil means.

None of these techniques disclose a carriage assembly that can be used with a high track density flexible magnetic disk which utilizes magnetic data tracks and optical servo tracks.

SUMMARY OF THE PRESENT INVENTION

It is therefore an object of the present invention to provide a carriage assembly for use with a flexible magnetic disk drive system having more than fifteen hundred data tracks per inch.

It is another object of the present invention to provide a carriage assembly for use with a flexible magnetic disk drive system that utilizes an optical servo tracking system.

It is another object of the present invention to provide a carriage assembly for use with a flexible magnetic disk drive system that utilizes a coarse positioning means operating in conjunction with a fine positioning means.

It is another object of the present invention to provide a carriage assembly for use with a flexible magnetic disk drive system that is compensated for thermal and hygroscopic expansion.

Briefly, the preferred embodiment of the present invention includes a stepper motor attached to a base carriage assembly. A fine position actuator which includes an upper and a lower magnetic read/write head mounted on upper and lower head arms is suspended from the base carriage by a pair of flexible members or flexures. The permanent magnet of a voice coil motor is mounted on the base carriage while the voice coil bobbin is attached to the fine position actuator. The stepper motor drives the base carriage for course positioning over a flexible magnetic disk while the voice coil motor drives the fine position actuator for fine positioning over the disk.

A light source, an optical assembly and an optical detector are mounted on the upper head arm and provide a means for reading optical servo tracking information from the magnetic disk. An electrical signal, derived from the optical detector, is sent to the voice coil bobbin as current flow which causes movement of the fine position actuator. By this procedure, actuator movement as small as $1 \times 10^{-6}$ inches is controllable. Therefore, track densities of greater than fifteen hundred tracks per inch are readable. During course positioning movement by the stepper motor, an infrared emitter/detector sensor controls movement of the fine position actuator by reflecting light off a reflective pad mounted on the voice coil magnet.

The effects of thermal and hygroscopic expansion in the fine position actuator are nullified by balancing the materials used to construct various components of the fine position actuator.

An advantage of the present invention is that the carriage assembly is capable of use with a flexible disk drive system having track densities greater than fifteen hundred tracks per inch.

Another advantage of the present invention is that the fine position actuator utilizes an optical servo tracking system.

Another advantage of the present invention is that the base carriage is driven by a coarse positioning system means while the fine position actuator is drive by a fine positioning means.

Another advantage of the present invention is that the carriage assembly utilizes a stepper motor and a voice coil motor for driving the fine position actuator supported on flexures.

Another advantage of the present invention is that the effects of thermal and hygroscopic expansion are nullified by balancing the materials used in constructing the fine position actuator.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a top view of a carriage assembly according to the present invention;

FIG. 2 is a side view of the carriage assembly of FIG. 1;

FIG. 3 is a side view of a standard voice coil motor adopted for use with the present invention;

FIG. 4 is a block diagram of the carriage assembly of FIG. 1;

FIG. 5 is a side view of the upper and lower magnetic read/write heads attached to the upper and lower head arms; and FIG. 6 is a block diagram of a fine position actuator according to the present invention.

DETAILED DESCRIPTION OF THE PREFERRED EMBODIMENT

FIG. 1 shows a top view of a carriage assembly designated by the general reference numeral 10. A base carriage 14 is slidably attached to a pair of carriage guide rods 16. A stepper motor 20 is mechanically attached to the base carriage 14 by a stepper actuator band 22. A voice coil magnet 26 is attached to the base carriage 14 and a voice coil bobbin 28 is positioned to electromagnetically interact with the magnet 26. An upper head arm 30 and a connecting flexure 31 are positioned near the voice coil bobbin 28. A magnet housing 32 surrounds the magnet 26 and the bobbin 28. The combination of the magnet 26, bobbin 28 and housing 32 comprise part of a voice coil assembly 33.

An optical assembly 34, a light source 36 and an upper magnetic read/write head 40 are positioned on the upper arm 30. A lens is positioned at the end of the optical assembly 34 nearest the upper magnetic head 40 and an optical detector 44 is positioned at the other end of the optical assembly 34. A magnetic preamplifier 46 positioned on the upper head arm 30, is electrically connected to the magnetic head 40 by a plurality of leads 47. A bundle of electrical leads 48 electrically connects the magnetic preamplifier 46 with signal processing equipment external to the carriage assembly 10. An optical preamplifier 50, positioned on the upper head arm 30, is electrically connected to the optical detector 44 by a plurality of leads 52. A bundle of electrical leads 54 electrically connects the optical preamplifier 50 with external signal processing circuitry.

A magnetic disk 56 is positioned underneath the upper arm 30. The disk 56 includes a plurality of optical servo tracking areas 58 and plurality of data storage areas 60. For example, the servo tracking areas 58 may comprise a plurality of circular rings inscribed in the surface of a floppy disk and the data storage areas 60 may comprise the non-inscribed area existing between adjacent servo tracks 58. A pitch distance "w" is the distance from the center of one servo track 58 to the center of an adjacent servo track 58. Typically, the distance w is approximately $8 \times 10^{-4}$ inches.

The upper head arm 30, the voice coil bobbin 28, the optical assembly 34, the light source 36 and the upper magnetic head 40 comprise part of an assembly referred to as a fine position actuator 62. The base carriage 14 comprises a side member 64 and a side member 66 with a cavity 68 positioned between the members 64 and 66. The fine position actuator 62 is positioned in the cavity 68 and is mechanically connected to the member 64 by a front flexure 70 and a rear flexure 72. The flexures 70 and 72 provide substantially friction free support for the fine position actuator 62 and in the preferred embodiment, comprise thin flexible pieces of stainless steel. The front flexure 70 is attached between the front of the fine position actuator 62 and the member 64 and the rear flexure 72 is attached between the rear of the fine position actuator and the member 64.

FIG. 2 is a side view of carriage assembly 10 and shows that the fine position actuator 62 also includes a lower magnetic read/write head 80 positioned underneath the disk 56 and the upper head 40. The lower magnetic head 80 is attached to a lower head mount 82 which is sized to slide within the base carriage 14. The lower head mount 82 is one continuous piece that has a bottom part 84 and a top part 86. In FIG. 2 part of the side member 66 is cut away so as to clearly show the top part 86. A magnetic preamplifier 87 is electrically connected to the lower head 80 by a plurality of leads 88 and to external signal processing circuitry by a bundle of electrical leads 89.

An aperture 90 extends perpendicularly through the upper magnetic head 40 and through the upper head arm 30 so as to provide an optical pathway from the light source 36 and lens 42 to the disk 56. A head load spring 92 and the flexure 31 connect the upper head arm 30 to the lower head mount 82. A flexure clamp 94 is positioned over the connecting flexure 31 for providing support to the arm 30 when the arm 30 is raised for access to the disk 56. This allows the flexure 31 to bend instead of twisting and evenly distributes the load of the flexure 31 to the lower head mount 82. A pair of terminals 96, for accepting a plurality of electrical leads 98 from the voice coil bobbin 28, are positioned about a positioning sensor 100. The sensor 100 comprises a position sensing means, e.g. a Hall effect sensor, a capacitive or inductive pick-up or an optical sensor.

FIG. 3 show the positions of the sensor 100 and the bobbin 28 in more detail. The voice coil bobbin 28 is wound around the magnet 26 with an air gap 102 existing between the bobbin 28 and the magnet 26. Part of the bobbin 28 is cut away in FIG. 3 to show that a reflective pad 104, e.g. a piece of white polyethylene terephthalate (Mylar) and a magnetic flux field shunt 106 are positioned on an end of the magnet 26, adjacent to the sensor 100. A gap 108 exists between the sensor 100 and the reflective pad 104. In the preferred embodiment, the sensor 100 comprises a commercially available light reflection emitter/sensor which includes an infrared emitter and an NPN phototransistor detector. A plurality of electrical leads 110 are connected to the sensor 100.

FIG. 4 shows the movement of the fine position actuator 62 relative to the base carriage 14. The fine position actuator 62 is shown in an extended position indicating that the actuator 62 has advanced in the direction of the arrow relative to the base carriage 14. As a result of this movement, the front flexure 70 and the rear flexure 72 are distorted or curved. The voice coil bobbin 28, which is part of the fine position actuator 62, moves with the actuator 62. The magnet 26 is attached to the base carriage 14 which travels in the direction of the arrow along the guide rods 16 when actuated by the stepper motor 20.

FIG. 5 shows the manner in which the upper magnetic head 40 and the lower magnetic head 80 are attached to the upper head arm 30 and the lower head mount 82 respectively. The upper head 40 is attached to an upper head gimbal 111 by a pair of upper head mount brackets 112. The lower head 80 is attached to a lower head gimbal 113 by a pair of lower mount brackets 114. A load member 115 is positioned near the lower head gimbal 113 approximately along a centerline 116 running through the geometric center of the lower head 80. The gimbals 111 and 113 are thin flexible metal members positioned flush with the upper head arm 30 and lower head mount 82 respectively. A pair of cavities 117 and 118 extend along the length of the gimbals 111 and 113, respectively, for allowing movement of the gimbals 111 and 113.

The upper head 40 is loaded, by the spring 92 (shown in FIG. 2), to the disk 56, the lower head 80 and the load member 115. The spring rate of the lower gimbal 113 is much less than the spring rate of the upper gimbal 111, thereby allowing the lower head 80 to gimbal or rotate about the load member 115 to comply with the upper head 40. In other words, movement of the upper head 40 causes similar movement in the lower head 80. Thus, the carriage assembly 10 utilizes a fixed or slightly compliant upper head 40 and a compliant lower head 80.

FIG. 6 is a schematic diagram showing part of the fine position actuator 62 with a plurality of important distances marked for reference. The distance $X_1$ is the distance from an end 126 of the upper head arm 30 where the connecting flexure 31 attaches, to a face 127 of the lower head mount 82 where the flexure 31 attaches. Thus, $X_1$ is also the length of the flexure 31 extending between the upper head arm 30 and the lower head mount 82.

The upper head 40 comprises an upper head slider 128 and an upper head read/write element 130. Similarly, the lower head 80 comprises a lower head slider 132 and a lower head read/write element 124. The distance $X_2$ is the distance from the end 126 of the upper arm 30 to a read/write centerline 136 which runs through the approximate center of the upper head element 130. The distance $X_4$ is the distance from the face 127 to a read/write centerline 138 which runs through the approximate center of the lower head element 134. The distance $X_3$ is the distance between the read/write centerline 136 and the read/write centerline 138.

Referring to FIG. 1, the functioning of the carriage asssembly 10 can be explained. Magnetic data stored on the data storage areas 60 is read and/or written by the upper and lower magnetic heads 40 and 80. The magnetic preamplifiers 46 and 87 amplify the signals dectected by the magnetic heads 40 and 80 and direct the amplified signal to external electrical processing circuitry via the electrical leads 48 and 89.

The stepper motor 20 functions to provide course positioning of the carriage assembly 10 over the disk 56. The stepper motor 20 moves the base carriage 14 along the guide rods 16 in discrete increments or steps of approximately 0.1875 millimeters per step. The voice coil assembly 33 provides the fine positioning function by driving the fine position actuator in a 0.040 inches nominal stroke (i.e., 0.020 inches in either the forward or backward direction). Precise positioning of the upper magnetic head 40 over one of the data storage areas 60 is accomplished by an optical servo tracking procedure. Light from the light source 36 (e.g. an infrared light emitting diode) passes through the aperture 90, is reflected off the disk 56 and is directed onto the lens 42 after passing back through the aperture 90. Less light is reflected by the servo tracking areas 58 than by the data storage areas 60 creating a light pattern of alternating light and dark areas. The light reflected onto the lens 42 is routed through the optical assembly 34 to the detector 44 where the light pattern is detected. Processing of the light pattern, through the optical preamplifier 50 and external electronic circuitry, yields a control signal which is routed to the voice coil bobbin 28 as current flow. A method for processing the light pattern is disclosed in U.S. patent application Ser. No. 07/178,542. Current flowing in the bobbin 28, in the presence of a magnetic field generated by the magnet 26, produces an electromotive force which moves the fine position actuator 62. The bobbin 28 is free to move relative to the magnet 26 because of the air gap 102.

When the stepper motor 20 is driving the base carriage 14, positioning control of the fine position actuator 62 via the optical assembly 34 is not possible. In this situation, the positioning sensor 100 is utilized to control movement of the actuator 62. The sensor 100 is attached to the fine position actuator 62 while the reflective pad 104 is attached to the shunt 106 which is attached to the magnet 26 and moves with the base carriage 14. Referring to FIG. 3, when the actuator 62 moves relative to the pad 104, the gap 108 changes. Light emitted from the sensor 100 is reflected off the pad 104 and is collected by the sensor 100 and is converted to a gain signal. The amplified gain signal is routed to the bobbin 28 which controls movement of the actuator 62 as described previously. The pad 104 is chosen so that a linear reflectance signal is obtained over a range of distances for the gap 108 of approximately 0.075 inches.

Referring to FIG. 4, it can be seen that the fine position actuator 62 can move both with the base carriage 14 and independent of the base carriage 14 because of the flexures 70 and 72. The connecting flexure 31, shown in FIG. 2, allows the upper head arm 30 to be raised so that the disk 56 can be inserted between the upper head 40 and the lower head 80.

The lower head 80, shown in FIG. 2, is dependent on the upper head 40 for servo tracking information. Positioning of the lower head 80 over data storage areas on the disk 56 is possible because the separation between the upper read/write element 130 and the lower read/write element 134 (the distance $X_3$ shown in FIG. 6) is known. The elements 130 and 134 are the components of the heads 40 and 80 respectively that actually read and/or write magnetic data. Because the head 80 is attached to the lower head mount 82, which is part of the fine position actuator, the head 80 can be positioned relative to the disk 56 by utilizing servo tracking information from the optical assembly 34.

Because the separation distance w (shown in FIG. 1) on the disk 56 is very small, extra measures must be taken in constructing the carriage assembly 10 to ensure that accurate positioning of the magnetic heads 40 and 80 over the disk 56 will be possible. Specifically, the effects of thermal and hygroscopic expansion of the materials in certain elements of the fine position actuator 62 and the disk 56 must be accounted for. Consideration of the distances $X_1$, $X_2$, $X_3$ and $X_4$ shown in FIG. 6 yields a method for nullifying the effects of thermal and hygroscopic expansion. Each of the members which are spanned by one of the distances $X_1$, $X_2$, $X_3$ or $X_4$ are constructed from materials such that equation 1 below is satisfied.

$$X_1(a_1 + b_1) + X_2(a_2 + b_2) + X_3(a_3 + b_3) + X_3(a_5 + b_5) = X_4(a_4 + b_4) \quad (1)$$

where
 a = coefficient of thermal expansion; and
 b = coefficient of hygroscopic expansion.

The subscripts after an individual parameter a or b in equation 1 indicate that the coefficient for the material that comprises the member spanned by the distance X bearing the same subscript is indicated. For example, the term $X_1(a_1+b_1)$ means that the length of the flexture 31 is multiplied by the sum of the coefficients of thermal and hygroscopic expansion for the material from which the flexture 31 is comprised. Additionally, the $(a_3+b_3)$ term refers to the length of the disk 56 spanned by the distance $X_3$ and the $(a_5+b_5)$ term refers to the lengths of the upper head slider 128 and the lower head slider 132 spanned by the distance $X_3$. It should be noted that upper head gimbal 111 and the lower head gimbal 113 (shown in FIG. 5) are comprised of material chosen so that the effects of thermal and hygroscopic expansion due to the gimbals 111 and 113 are eliminated from equation 1. In the most general case, a term for expansion of the gimbals 111 and 113 should be added to equation 1.

In the preferred embodiment, the flexture 31 comprises chromium-nickel austenitic steel (AISI Type 301/302). The upper head arm 30 (the $X_2$ term) and the lower head mount 82 (the $X_4$ term) comprise thirty percent carbon fiber filled polycarbonate. The disk 56 (the $X_3$ term) comprises polyethylene terephthalate (Mylar). The gimbals 111 and 113 are comprised of chromium-nickel austenitic steel (AISI Type 301/302).

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A carriage assembly for use with a flexible magnetic disk drive system comprising:
 a first support means for supporting a magnet;
 a coarse positioning means mechanically connected to the first support means for moving the first support means in a linear direction;
 a second support means, attached to the first support means, for supporting a magnetic read/write head, the second support means comprises an upper arm for supporting an upper magnetic read/write head and a lower arm for supporting a lower magnetic read/write head;
 an upper head gimbal for providing a flexible attachment site for attaching said upper magnetic read/write head to said upper arm, a lower gimbal for providing a flexible attachment site for attaching said lower magnetic read/write head to said lower arm, said upper head gimbal and said lower head gimbal comprise thin flexible pieces of metal, said lower gimbal has a different spring rate than the spring rate of said upper gimbal;
 an optical means positioned over the second support means for deriving servo tracking information from a flexible magnetic disk; and
 a coil member positioned to electromagnetically interact with said magnet and to cause movement of said second support member in response to an electrical signal derived from the optical means.

2. The carriage assembly of claim 1 wherein,
 the coarse positioning means comprises a stepper motor.

3. The carriage assembly of claim 1 wherein,
 the second support means is attached to the first support means by at least one flat flexible attachment member.

4. The carriage assembly of claim 3 wherein,
 said flexible attachment member comprises a thin piece of metal.

5. The carriage assembly of claim 1 wherein,
 the coil member is attached to the second support means.

6. The carriage assembly of claim 1 further comprising,
 a position sensing means for determining a distance separating the second support means from the first support means.

7. The carriage assembly of claim 6 wherein the position sensing means comprises:
 a light reflection sensing and emitting semiconductor device attached to the second support means; and
 a reflective pad attached to said magnet.

8. The carriage assembly of claim 1 wherein,
 the second support means comprises materials that compensate for the effects of hygroscopic and thermal expansion.

9. The carriage assembly of claim 1 further comprising:
 a hinge means connecting said upper arm to said lower arm for allowing movement of said upper arm relative to said lower arm whereby said magnetic disk can be inserted between said upper and lower arms.

10. The carriage assembly of claim 9 wherein,
 the hinge means comprises a flat flexible piece of metal.

11. The carriage assembly of claim 1 wherein,
 said upper and lower arms, said upper and lower head gimbals, said upper and lower magnetic read/write heads and the hinge means are comprised of materials that compensate for the effects of hygroscopic and thermal expansion.

12. The carriage assembly of claim 11 wherein,
said upper and lower arms comprise carbon filled polycarbonate material.

13. The carriage assembly of claim 11 wherein,
said hinge means comprises chromium-nickel austenitic steel.

14. The carriage assembly of claim 13 wherein,
said upper and lower head gimbals comprise chromium-nickel austenitic steel.

15. The carriage assembly of claim 1 wherein,
said lower gimbal has a higher spring rate than the spring rate of said upper gimbal.

16. A carriage assembly for use with a flexible magnetic disk drive system comprising:
a first support means for supporting a magnet;
a coarse positioning means mechanically connected to the first support means for moving the first support means in a linear direction;
a second support means, attached to the first support means, for supporting a magnetic read/write head, the second support means comprises an upper arm for supporting an upper magnetic read/write head and a lower arm for supporting a lower magnetic read/write head;
an upper head gimbal for providing a flexible attachment site for attaching said upper magnetic read/write head to said upper arm, a lower head gimbal for providing a flexible attachment site for attaching said lower magnetic read/write head to said lower arm, said upper head gimbal and said lower head gimbal comprise thin flexible pieces of metal, said lower gimbal has a different spring rate than the spring rate of said upper gimbal;
an optical means positioned over the second support means for deriving servo tracking information from a flexible magnetic disk, said magnetic read/write head includes an aperture extending perpendicularly through said magnetic read/write head for allowing light to pass between said magnetic disk and the optical means; and
a coil member positioned to electromagnetically interact with said magnet and to cause movement of said second support member in response to an electrical signal derived from the optical means.

17. The carriage assembly of claim 16 wherein,
the coarse positioning means comprises a stepper motor.

18. The carriage assembly of claim 16 wherein,
the second support means is attached to the first support means by at least one flat flexible attachment member.

19. The carriage assembly of claim 18 wherein,
said flexible attachment member comprises a thin piece of metal.

20. The carriage assembly of claim 16 wherein,
the coil member is attached to the second support means.

21. The carriage assembly of claim 16 further comprising,
a position sensing means for determining a distance separating the second support means from the first support means.

22. The carriage assembly of claim 21 wherein the position sensing means comprises:
a light reflection sensing and emitting semiconductor device attached to the second support means; and
a reflective pad attached to said magnet.

23. The carriage assembly of claim 16 wherein,
the second support means comprises materials that compensate for the effects of hygroscopic and thermal expansion.

24. The carriage assembly of claim 16 further comprising:
a hinge means connecting said upper arm to said lower arm for allowing movement of said upper arm relative to said lower arm whereby said magnetic disk can be inserted between said upper and lower arms.

25. The carriage assembly of claim 24 wherein,
the hinge means comprises a flat flexible piece of metal.

26. The carriage assembly of claim 16 wherein,
said upper and lower arms, said upper and lower head gimbals, said upper and lower magnetic read/write heads and the hinge means are comprised of materials that compensate for the effects of hygroscopic and thermal expansion.

27. The carriage assembly of claim 26 wherein,
said upper and lower arms comprise carbon filled polycarbonate material.

28. The carriage assembly of claim 26 wherein,
said hinge means comprises chromium-nickel austenitic steel.

29. The carriage assembly of claim 28 wherein,
said upper and lower head gimbals comprise chromium-nickel austenitic steel.

30. The carriage assembly of claim 16 wherein,
said lower gimbal has a higher spring rate than the spring rate of said upper gimbal.

31. The carriage assembly of claim 16 wherein,
the optical means is positioned on the second support means.

* * * * *